(12) United States Patent
Robinson et al.

(10) Patent No.: US 8,203,114 B2
(45) Date of Patent: Jun. 19, 2012

(54) ADAPTIVE SPATIAL-SPECTRAL PROCESSING (ASSP)

(75) Inventors: Ian S. Robinson, Redondo Beach, CA (US); Anthony M. Sommese, Eatons Neck, NY (US)

(73) Assignee: Raytheon Company, Waltham, MA (US)

( * ) Notice: Subject to any disclaimer, the term of this patent is extended or adjusted under 35 U.S.C. 154(b) by 475 days.

(21) Appl. No.: 12/466,191

(22) Filed: May 14, 2009

(65) Prior Publication Data

US 2010/0288910 A1 Nov. 18, 2010

(51) Int. Cl.
*H01L 27/00* (2006.01)
*G06K 9/00* (2006.01)

(52) U.S. Cl. .................. 250/226; 250/208.1; 382/103; 382/254

(58) Field of Classification Search .............. 250/226, 250/208.1; 382/103, 254
See application file for complete search history.

(56) References Cited

U.S. PATENT DOCUMENTS 6,804,400 B1 10/2004 Sharp

OTHER PUBLICATIONS

Weimin Liu, et al. "A Nested Spatial Window-Based Approach to Target Detection for Hyperspectral Imagery"; IEEE Standards No. 0-7803-8742-2; (c) 2004.

Susan M. Schweizer, et al. "Hyperspectral Imagery: Clutter Adaptation in Anomaly Detection"; IEEE Transactions on Information Theory, vol. 46, No. 5.; Aug. 2000.

Susan M. Schweizer, et al. "Efficient Detection in Hyperspectral Imagery"; IEEE Transactions on Image Processing, vol. 10, No. 4; Apr. 2001.

Kwon, H., et al., "Adaptive anomaly detection using subspace separation for hyperspectral imaging", Optical Engineering, vol. 42, No. 11 pp. 3342-3351 (2003).

Manolakis, D., "Hyperspectral Image Processing for Automatic Target Detection", Lincoln Library Journal, pp. 79-116 (2003).

International Search Report/Written Opinion dated Jun. 1, 2010 of PCT/US2010/024187 filed Feb. 12, 2010 (12 pages).

*Primary Examiner* — Seung C Sohn
(74) *Attorney, Agent, or Firm* — Pierce Atwood LLP; Joseph M. Maraia

(57) ABSTRACT

A hyperspectral imaging sensor and an adaptive spatial spectral processing filter capable of detecting, identifying, and/or classifying targets having a spatial extent of one pixel or less includes a sensor that may be oversampled such that a pixel is spatially smaller than the optical blur or point spread function of the sensor. Adaptive spatial spectral processing may be performed on hyperspectral image data to detect targets having spectral features that are known a priori, and/or that are anomalous compared to nearby pixels. Further, the adaptive spatial spectral processing may recover target energy spread over multiple pixels and reduce background clutter to increase the signal-to-noise ratio.

25 Claims, 5 Drawing Sheets

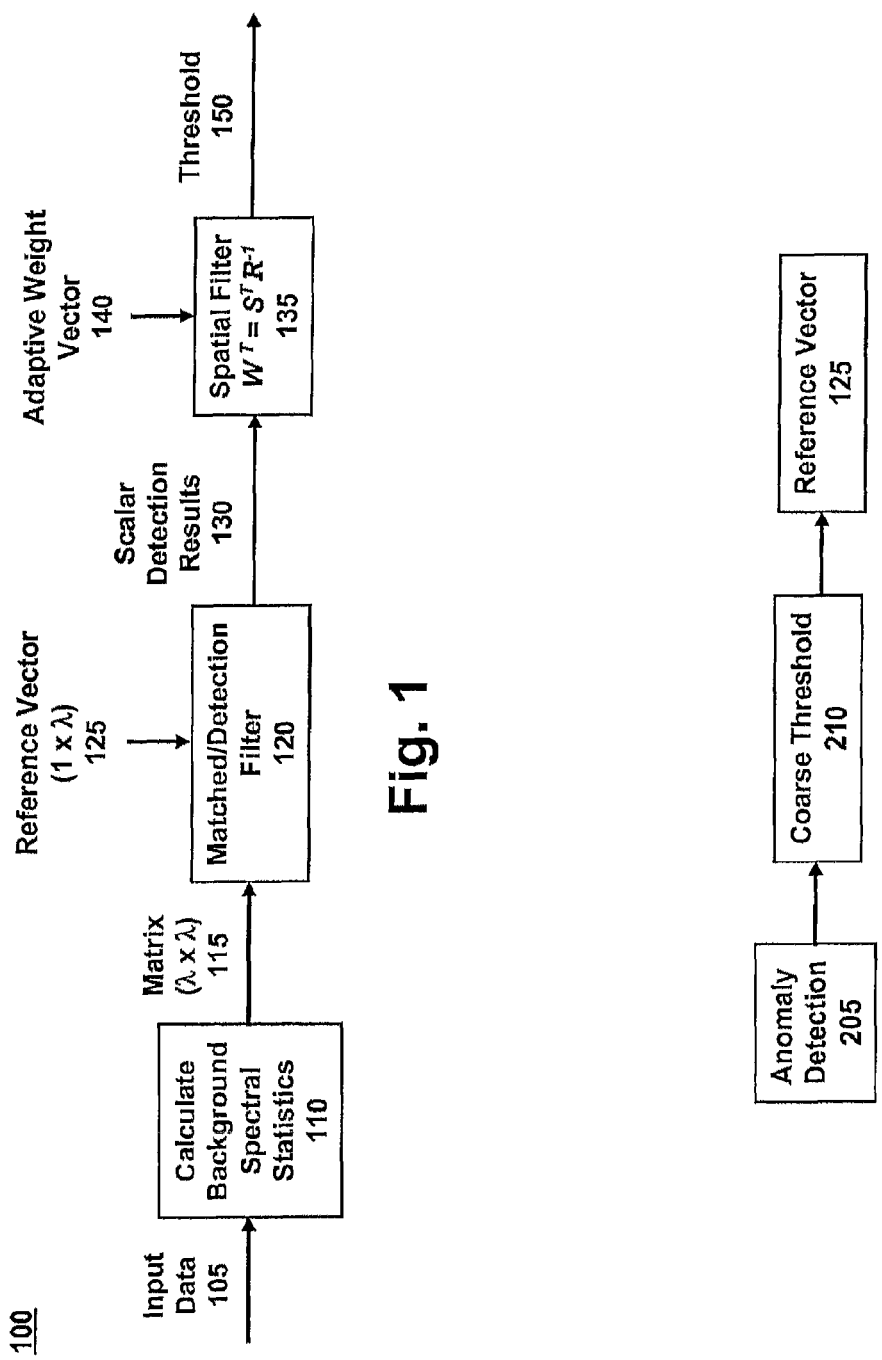

| "Airy Length" Blur | Gaussian Pixel Blur (1σ) | Energy on Detector | Q |
|---|---|---|---|
| 1 | 0.29 | 0.838 | (1/1)/2.44 = 0.4098 |
| 2 | 0.58 | 0.373 | (2/1)/2.44 = 0.8196 |
| 4 | 1.16 | 0.111 | (4/1)/2.44 = 1.63 |
| 6 | 1.74 | 0.051 | (6/1)/2.44 = 2.45 |
| 8 | 2.32 | 0.029 | (8/1)/2.44 = 3.26 |

ADAPTIVE SPATIAL-SPECTRAL PROCESSING (ASSP)

BACKGROUND

Conventional hyperspectral imaging sensors are configured to have sensor pixels that are approximately the same size or slightly larger than the point spread function of the sensor at most or all of the wavelengths captured. The point spread function describes the spreading or blurring of a point source in a captured image caused by the response of the imaging system to the point source. As a result, conventional hyperspectral imaging sensors may have relatively large physical pixels. Large physical pixels, however, have high solid angle-area products and receive a large etendue which limits the resolution of the sensor. As a consequence, the ground sample distance captured by a pixel may be too large for use in surveillance applications, for example.

Conventional hyperspectral imaging sensors, e.g., space-based sensors, tend to require large apertures, which increases the cost of the imaging system. In particular, the cost for space-based and airborne platforms, for example, may scale geometrically with the size of the aperture. Further, conventional processing algorithms used with conventional hyperspectral imaging sensors tend to produce inferior results when the energy from a point target is blurred over several pixels.

Accordingly, conventional hyperspectral imaging sensors and processing algorithms are inadequate for certain applications which may require detecting point targets blurred over multiple pixels and/or having a size of one pixel or less. Further, these applications may also require higher area coverage, resolution, and signal-to-noise ratio, and a smaller aperture than conventional systems can provide. Therefore, hyperspectral imaging sensors and processing algorithms having greater performance are desired.

SUMMARY

According to various embodiments, a hyperspectral imaging sensor in conjunction with adaptive spatial spectral processing enables a sensor to detect targets of smaller size or to be used with a smaller aperture. For a sensor providing a given ground sample distance, it is possible to use a larger f-number and an aperture which is 25-50% smaller than comparable conventional hyperspectral imaging systems. For example, a conventional hyperspectral imaging sensor, whose pixel size is larger than the point spread function at all of its wavelengths, may require a telescope aperture greater than 1.6 m in order to provide a 2 m ground sample distance at a slant range of 1300 km.

In conventional hyperspectral imaging sensors, the spatial response function (SRF) is dominated by the pixel dimension. The spatial response function is the full width, half maximum of the convolution of the optical point spread function (which is dependent on diffraction, optical aberrations, and slit size) with the detector function. According to an embodiment, using conventional processing, it is possible to detect most targets whose physical extents are larger than an SRF size. In another embodiment, however, a comparable telescope using a hyperspectral imaging sensor with adaptive spatial spectral processing may require only a 83-100 cm aperture, although the smaller aperture increases SRF due to diffraction effects. As a result, the payload mass of the telescope can be reduced by 30-70% (depending on the exact span of spectrum covered).

In an embodiment, a hyperspectral imaging sensor can detect targets having a spatial extent of one SRF distance or less. The sensor can be spatially oversampled such that the sensor's pixels are spatially smaller than the optical blur of a point target, i.e., the pixel is smaller than the point spread function of the sensor at all or most wavelengths sensed. In such a system the SRF may vary with wavelength. Further, according to various embodiments, adaptive spatial spectral processing can be performed on hyperspectral image data generated by the sensor. For example, adaptive spatial spectral processing can be performed to detect targets having spectral features that are known a priori, and/or that are anomalous compared to nearby pixels. Further, adaptive spatial spectral processing can provide an increased effective signal-to-noise ratio per target by processing the data contained in multiple pixels; and reduce clutter by suppressing common mode background features. The information generated by the sensor and adaptive spatial spectral processing may be used, for example, to cue other imaging or threat response systems.

According to an embodiment, a hyperspectral imaging system comprises a hyperspectral sensor configured to capture hyperspectral images; a processor configured to identify targets, anomalies, prospective targets, and/or prospective anomalies within the hyperspectral images; and an adaptive spatial spectral filter configured to identify targets or anomalies based on the prospective targets or prospective anomalies, the targets having known spectral characteristics and the anomalies having anomalous spectral characteristics relative to nearby pixels.

According to a further embodiment, a hyperspectral processing method comprises receiving hyperspectral image data from a hyperspectral sensor; processing the hyperspectral image data to identify targets, anomalies, prospective targets, and/or prospective anomalies within the hyperspectral images; and adaptively filtering prospective targets or prospective anomalies to identify targets and/or anomalies, the targets having known spectral characteristics and the anomalies having anomalous spectral characteristics relative to nearby pixels.

According to various embodiments, pixels of the hyperspectral sensor are smaller than the point spread function of the hyperspectral sensor; a target or an anomaly has a spatial extent smaller than the point spread function of the sensor; a target or an anomaly has a spatial extent less than or equal to one pixel; the processor is a matched filter or an anomaly detector, the matched filter comprising reference vectors characterizing targets such that targets can be distinguished, identified, classified, and/or categorized, and the anomaly detector is configured to update a database of targets with a detected anomaly; a processor is configured to calculate background spectral statistics within the hyperspectral images to reduce background clutter; the adaptive spatial spectral filter recovers a signal associated with a target or an anomaly from a plurality of pixels; the adaptive spatial spectral filter comprises an adaptive weight vector having weighted factors determined based on an average point spread function, a spectrally varying point spread function, and/or different sized background windows of the captured images; the adaptive spatial spectral filter comprises a fixed weight vector based on a point spread function, and an adaptive weight vector based on a local covariance of single pixel results; and/or the adaptive spatial spectral filter post-processes single pixel results.

Further, according to various embodiments, hyperspectral imaging sensors, systems, and processing algorithms can be implemented in hardware (e.g., using ASICs or general purpose CPUs), software, or a combination of hardware and software.

These and other objects, features, and advantages of the invention will be apparent from the disclosure. It is to be understood that the summary, detailed description, and drawings are not restrictive of the scope of the inventive concept described herein.

BRIEF DESCRIPTION OF THE DRAWINGS

FIG. 1 shows target detection and adaptive spatial spectral processing according to an embodiment;

FIG. 2 shows anomaly detection according to an embodiment;

FIGS. 3A-3E show Airy length blur for point spread functions having Airy disk lengths of one, two, four, six, and eight pixels, respectively;

DETAILED DESCRIPTION

Figures 3, 4:
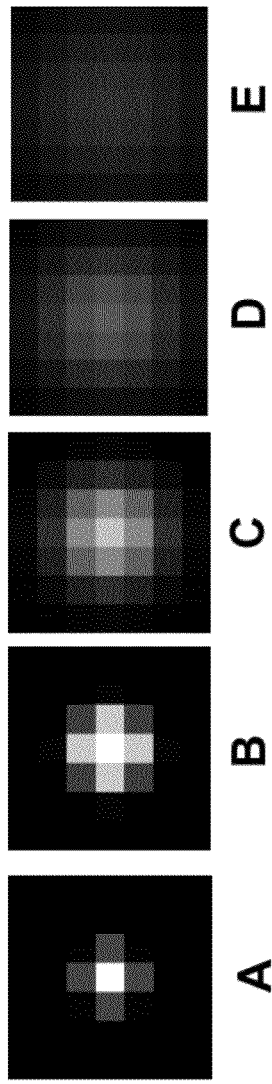
FIG. 4 shows Airy length blur, Gaussian pixel blur, energy on detector, and Q for point spread functions having Airy disk lengths of one, two, four, six, and eight pixels.

FIG. 1 shows target detection and adaptive spatial spectral processing 100 according to an embodiment. Different processing techniques may be used in conjunction with either oversampled or conventional hyperspectral imaging sensors to detect targets having a size of one SRF distance or less based on the target's contrast and the degree of a priori information available to processing algorithms regarding either the target or nearby background.

For example, according to various single pixel-processing algorithms, the spectrum of a pixel can be compared to determine its similarity to known reference spectrums and/or to other pixels in a region or scene. Further, the spectrum of a pixel selected by an analyst or by automated means can be described as a vector, for example, so that remaining spectral features can be tested for similarity to the selected pixel.

According to various embodiments, input hyperspectral imaging data 105 can be generated by a sensor having pixels smaller than the point spread function of the sensor, or by a conventional sensor having pixels larger than the point spread function of the sensor. Hyperspectral imaging data 105 can be represented as a 3-D hyperspectral cube, where each plane of the data has X and Y spatial coordinates for a different wavelength. Alternatively, or in addition to, each spatial coordinate can be represented as a vector of wavelengths.

Background spectral statistics 110 are calculated from hyperspectral imaging data 105. In many instances, energy in imaging data 105 tends to be concentrated in particular areas of the background. Calculating background spectral statistics 110 enables adaptive spatial spectral processing 100 to enhance detection of point targets by compensating for common mode background features near each target. In an embodiment, background spectral statistics 110 can output matrix 115 comprising, e.g., covariance or other statistical values.

Matched and/or detection filter 120 receives matrix 115 and scores each pixel to determine scalar detection results 130 for each spatial pixel. In an embodiment, matched filter 120 receives reference vector 125 comprising values for wavelengths representative of a target as a function of its spectrum.

Matched filter 120 can determine targets having spectral characteristics, which match known targets or classes of targets based on reference vector 125. According to various embodiments, reference vector 125 may be provided by a database of reference vectors. Further, the spectrum of a particular pixel may be identified as a potential anomaly and converted to spectral reference vector 125. Thus, the potential anomaly may function as reference vector 125 for the detection of similar targets.

FIG. 2 shows an example of generating spectral reference vector 125 using anomaly detector 205. Anomaly detector 205 determines pixels above a high threshold to be targets. Further, coarse threshold 210 determines pixels above a coarse threshold, but below the high threshold, to be potential targets. The potential target can then be converted to reference vector 125 in order to detect similar targets. In a further embodiment, all pixels above a single threshold are provided as spectral reference vectors 125, i.e., no coarse threshold is applied after anomaly detection.

Conventional techniques can additionally be used for detection of targets and anomalies, including those, which output a vector. According to various embodiments, the scene can be spatially segmented or clustered to calculate a superior local spectral covariance or other statistical measurement.

Adaptive spatial filter 135 filters further the hyperspectral imaging data to recover target energy blurred across multiple pixels using covariance matrix 115 of the local background spectral statistics and the sensor point spread function for the portion of the scene near the target, for example. In particular, the portions of the background considered to be local to the target can be based on the ratio of the point spread function to the size of a pixel. Adaptive spatial filter 135 increases the signal-to-variance (or error level) compared to merely integrating the target energy over the point spread function, because simple integration tends to accumulate clutter at approximately the same rate as target energy. According to various embodiments, spatial filter 135 may be a function of the transformation (transpose) of S, i.e., the optical blur energy integrated in each pixel, and the inverse of spatial covariance matrix R.

Figure 8:
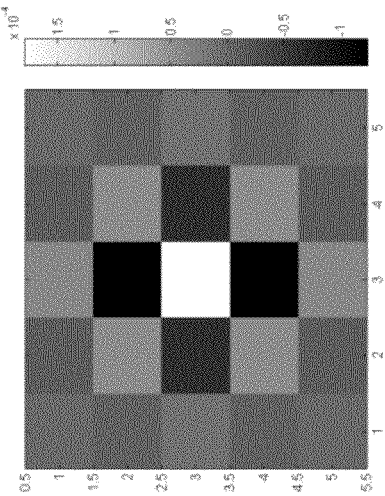
FIG. 8 shows a point spread function that is well approximated by an Airy Disc function whose nulls are three pixels across.
Figure 7:
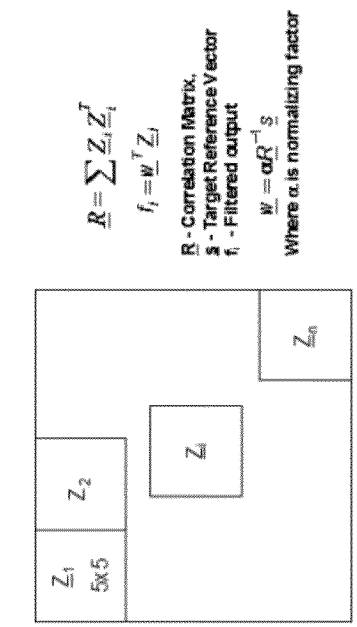
FIG. 7 shows a correlation matrix for a spectrally filtered image.

In an embodiment, R is selected based on the size of the point spread function compared to a sensor pixel and may typically have a size of 25 elements. FIG. 7 shows a corresponding 5×5 grid for R, and also that W is the matrix product of $R^{-1}$ and S times a scalar normalization product, $\alpha$. S, which is the discrete interpretation of the point spread function, can have the same dimensions as R. FIG. 8 shows an example of S for the case that the point spread function is well approximated by an Airy Disc function whose nulls are three pixels across.

Additional processing, however, may be required to implement adaptive spatial filter 135. Accordingly, in various embodiments, the application of adaptive spatial filter 135 is limited to regions comprising potential targets only.

According to various embodiments, adaptive weight vector 140 can be provided to adaptive spatial filter 135 in order to improve detection of targets whose spectral properties are known a priori by modifying a known spectral reference. In particular, adaptive weight vector 140 can comprise a fixed weight factor which is the discrete approximation of the sensor point spread function and a variable weighted factor which is a function of the pixels in the local neighborhood of the target. Thus, reference vector 125 can be modified by adaptive weight vector 140.

Further, according to an embodiment, single pixel processing can be used to segregate a scene into background, targets, and potential targets. In order to reduce computational requirements, background and target pixels may not be subjected to further processing. Adaptive spatial processing, however, may be performed on potential targets in order to conclusively determine if they are in fact targets.

Additionally, according to an embodiment, anomalies corresponding to targets not having a spectrum that is known a priori may be detected using single pixel processing, e.g., using an RX processing algorithm. In an embodiment, anomaly filter results are tested with two thresholds. In particular, a higher threshold can detect obvious anomalies, i.e., having a magnitude of six or more standard deviations. Thereafter, a lower (i.e., coarser) threshold can be applied having a magnitude of three standard deviations, for example. Pixels whose filter scores are between the two thresholds are potential anomaly targets. Yet, more than 99% of the pixels may fall below the coarse threshold, for data having a Gaussian distribution. Accordingly, the spectrum of each potential anomaly is treated as a target reference vector 125.

In further embodiments, the point spread function can be assumed to be constant for all spectral wavelengths. Alternatively, different point spread functions specific to each spectral wavelength can be used to account for wavelength dependent diffraction effects. Additionally, in an embodiment, a user can specify regions of the spectrum over which the point spread function is determined to be approximately constant. Further, in an embodiment, non-square pixels can be used having a larger extent in the spectral direction than in the spatial direction if the point spread function of the system is much larger than a spatial pixel.

FIGS. 3A-3E show graphically the energy received by an array of pixels for various point spread functions. In particular, the intensity of the energy corresponding to the point spread functions may be described by an Airy pattern comprising an Airy disk and a series of concentric rings formed as a result of diffraction. FIG. 3A shows an example where the physical pixels have substantially the same spatial extent as the point spread function, i.e., the null-to-null length of the Airy disk is substantially the same length as the pixel. As can be seen in FIG. 3A, the majority of the energy corresponding to the point target is captured by a single pixel.

FIGS. 3B-3E show further examples where the length of the Airy disk is substantially the width of two, four, six, or eight pixels, respectively. As can be seen in FIGS. 3B-3E, the energy is dispersed (i.e., blurred) over a greater number of pixels as the ratio of the length of the Airy disk to the length of the pixel increases.

FIG. 4 shows values for Airy length blur, Gaussian pixel blur, energy on detector, and Q for Airy disk lengths of one, two, four, six, and eight pixels. In particular, Gaussian pixel blur approximates Airy disc length blur since a Gaussian curve can closely approximate an Airy disk in a more simple mathematical form; energy on detector is a ratio of energy received by a primary pixel to the total energy of the point target; and Q is a quality factor proportional to the ratio of the pixel to the Airy disc function.

Conventional hyperspectral imaging sensors may be configured to have an Airy disc length blur of one pixel. In this case, 84-100% of target energy is contained in a single pixel (see, e.g., FIG. 3A). As can be seen from the values of the energy on detector, however, the energy from a point target disperses rapidly as Airy disc length increases, e.g., a pixel captures at most 11% of target energy when the Airy disc function to pixel ratio is four. According to various embodiments, more energy for a given blur can be recovered as compared to the energy on detector value for conventional hyperspectral imaging systems.

Figure 5:
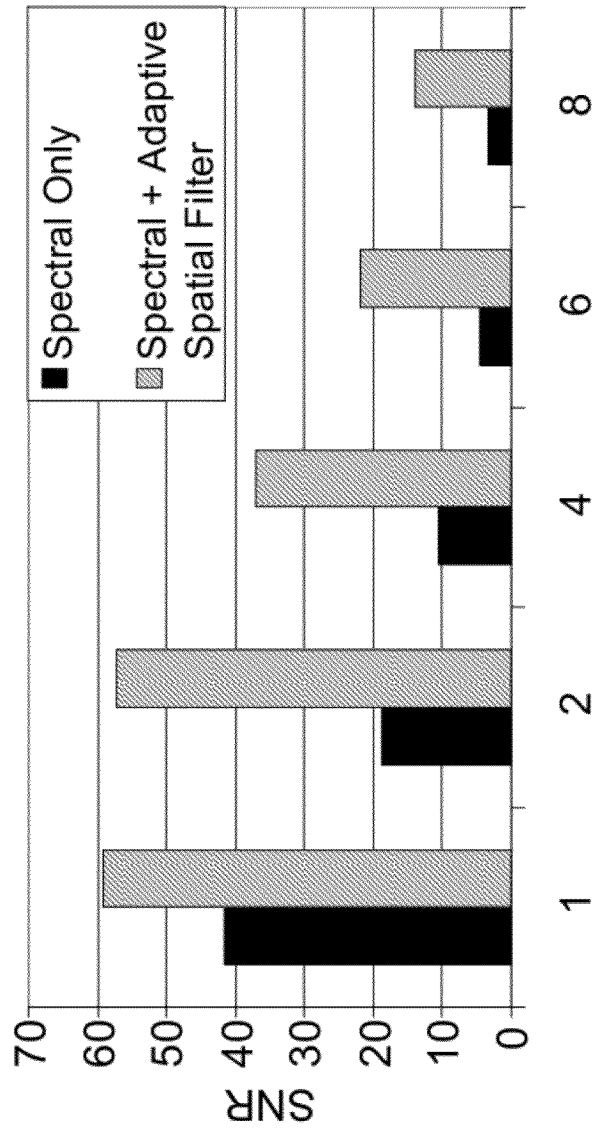
FIG. 5 shows the signal-to-noise ratio for spectral only processing and for adaptive spatial spectral processing as a function of point spread function size.

FIG. 5 shows results representative of the signal-to-noise ratio for several tested targets as a function of Airy disk length, i.e., the ratio of the Airy disc function to pixel size. In particular, the solid bars show results for conventional, i.e., spectral only matched filter processing, and the hatched bars show results for adaptive spatial spectral filter processing. As can be seen in FIG. 5, the adaptive spatial spectral processing recovered an amount of energy for Airy disk lengths of one to four which was greater or approximately equivalent to the amount of energy recovered for conventional spectral processing for an Airy disk of length one. It is notable that adaptive spatial spectral processing provided superior results even for an Airy disk function of one. Hence, adaptive spatial spectral processing can improve the signal-to-noise ratio for both oversampled and conventional hyperspectral imaging sensors.

Figure 6B:
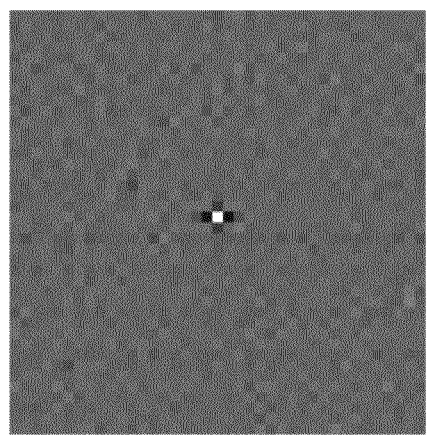
FIG. 6B shows an adaptive spatial spectral filtered output for the target.
Figure 6A:
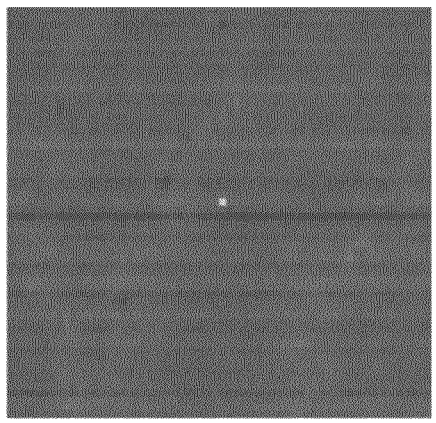
FIG. 6A shows a conventional spectral filtered output for a target.

FIGS. 6A and 6B show detection scores for a particular target after conventional spectral processing and adaptive spatial spectral processing, respectively. In this example, the sensor was configured to have an Airy disc length of six, with higher energy pixels illustrated as being more white. As can be seen in FIG. 6B, the adaptive spatial spectral processing yields a center pixel having four to five times the energy as the corresponding pixel shown in FIG. 6A.

We claim:

1. A hyperspectral imaging system comprising:
   a hyperspectral sensor configured to capture hyperspectral images;
   one or more processors configured to identify targets and prospective targets within the hyperspectral images;
   a spectral filter configured to convert the hyperspectral images to scalar detection results; and
   an adaptive spatial filter configured to recover target energy blurred across multiple pixels and to identify targets based on the prospective targets, the targets having known spectral characteristics.

2. The system of claim 1, wherein pixels of the hyperspectral sensor are smaller than a point spread function of the hyperspectral sensor.

3. The system of claim 1, wherein one of the targets has a spatial extent smaller than a point spread function of the sensor.

4. The system of claim 1, wherein one of the targets has a spatial extent less than or equal to one pixel.

5. The system of claim 1, wherein the one or more processors comprises a matched filter,
   the matched filter comprising reference vectors characterizing targets such that targets can be distinguished, identified, classified, and/or categorized.

6. The system of claim 1, wherein the one or more processors are configured to calculate background spectral statistics related to the hyperspectral images to reduce background clutter.

7. The system of claim 1, wherein the adaptive spatial filter recovers a signal associated with a target using a plurality of pixels.

8. The system of claim 7, wherein the adaptive spatial filter assumes a constant point spread function as a function of wavelength.

9. The system of claim 7, wherein a spatial covariance of the scalar detection results adaptively modifies the adaptive spatial filter.

10. The system of claim 1, wherein the adaptive spatial filter comprises an adaptive weight vector having weight factors determined based on one or more of an average point spread function, a spectrally varying point spread function, and/or a window sized to an extent of the target energy blurred across multiple pixels.

11. The system of claim 10, wherein the adaptive spatial filter comprises a fixed weight vector based on a point spread function, and an adaptive weight vector based on a spatial covariance of scalar single pixel results.

12. The system of claim 1, wherein the adaptive spatial filter post-processes single pixel detection results.

13. A hyperspectral processing method, comprising:
receiving hyperspectral image data from a hyperspectral sensor;
processing the hyperspectral image data to identify targets and prospective targets within the hyperspectral images; and
adaptively filtering prospective targets to recover target energy blurred across multiple pixels and to identify targets, the targets having known spectral characteristics.

14. The method of claim 13, wherein the hyperspectral image data has pixels smaller than a point spread function of the hyperspectral sensor.

15. The method of claim 13, wherein one of the targets in the hyperspectral image data has a spatial extent smaller than a point spread function of the sensor.

16. The method of claim 13, wherein a one of the targets in the hyperspectral image data has a spatial extent less than or equal to one pixel.

17. The method of claim 13, wherein the processing comprises matched filtering,
the matched filtering comprising using reference vectors characterizing targets such that target spectra resulting from individual pixels can be distinguished, identified, classified, and/or categorized.

18. The method of claim 13, further comprising calculating background spectral statistics related to the hyperspectral image data to reduce background clutter associated with the image data.

19. The method of claim 13, wherein the adaptively filtering recovers a signal associated with a target from a plurality of pixels within the hyperspectral image data.

20. The method of claim 19, wherein the adaptive filtering comprises assuming a constant point spread function as a function of wavelength.

21. The method of claim 19, further comprising modifying the adaptive filtering with a spatial covariance of scalar detection results.

22. The method of claim 13, wherein the adaptively filtering comprises an adaptive weight vector having weight factors determined based on one or more of an average point spread function, a spectrally varying point spread function, and a window sized to an extent of the target energy blurred across multiple pixels.

23. The method of claim 22, wherein the adaptive filtering comprises a fixed weight vector based on a point spread function, and an adaptive weight vector based on a spatial covariance of scalar single pixel results.

24. A hyperspectral imaging system comprising:
a hyperspectral sensor configured to capture hyperspectral images;
one or more processors configured to identify anomalies and prospective anomalies within the hyperspectral images;
a spectral filter configured to convert the hyperspectral images to scalar detection results; and
an adaptive spatial filter configured to recover target energy blurred across multiple pixels for the potential anomalies and to identify anomalies based on the prospective anomalies, the anomalies having anomalous spectral characteristics relative to nearby pixels.

25. A hyperspectral imaging system comprising:
a hyperspectral sensor configured to capture a hyperspectral image; and
one or more processors configured to:
identify, using an anomaly detection filter, potential anomalies within the hyperspectral image above a coarse threshold and below a high threshold;
convert spectra from one of the potential anomalies to a target reference vector;
convert the hyperspectral image to a scalar detection result using the target reference vector in a matched filter; and
process the scalar detection results using an adaptive spatial filter to recover target energy spread over multiple pixels.

* * * * *